US008167159B2

(12) United States Patent
Nelson (10) Patent No.: US 8,167,159 B2
(45) Date of Patent: May 1, 2012

(54) COLLAPSIBLE AND REUSABLE DRUM

(76) Inventor: Charles M Nelson, Pening (MY)

( * ) Notice: Subject to any disclaimer, the term of this patent is extended or adjusted under 35 U.S.C. 154(b) by 392 days.

(21) Appl. No.: 12/478,574

(22) Filed: Jun. 4, 2009

(65) Prior Publication Data
US 2010/0000994 A1 Jan. 7, 2010

Related U.S. Application Data

(60) Provisional application No. 61/058,713, filed on Jun. 4, 2008.

(51) Int. Cl.
*B65D 6/18* (2006.01)
*B65D 88/16* (2006.01)
(52) U.S. Cl. .................................. 220/9.2; 220/4.28
(58) Field of Classification Search ............ 229/117.35, 229/117.27; 220/1.6, 1.5, 7, 6, 495.01, 200, 220/9.3, 9.2, 9.1, 9.4, 495.08, 495.06, FOR. 120, 220/FOR. 115, FOR. 174, FOR. 173, FOR. 172; *B65D 6/18, 88/16*
See application file for complete search history.

(56) References Cited

U.S. PATENT DOCUMENTS

| | | | | |
|---|---|---|---|---|
| 2,658,614 A * | 11/1953 | Van Patten | ...... | 206/595 |
| 3,115,986 A * | 12/1963 | Grof | ...... | 220/495.08 |
| 3,167,209 A * | 1/1965 | Jones | ...... | 383/22 |
| 3,484,017 A * | 12/1969 | O'Donnell | ...... | 229/117.33 |
| 4,421,253 A * | 12/1983 | Croley | ...... | 222/105 |
| 4,585,143 A * | 4/1986 | Fremow et al. | ...... | 206/386 |
| 4,850,506 A * | 7/1989 | Heaps et al. | ...... | 229/117.3 |
| 4,865,202 A * | 9/1989 | Day | ...... | 206/597 |
| 5,111,938 A * | 5/1992 | Soprano et al. | ...... | 206/386 |
| 5,423,428 A * | 6/1995 | Selz | ...... | 206/597 |
| 6,000,549 A * | 12/1999 | Perkins | ...... | 206/596 |
| 6,550,645 B2 | 4/2003 | Nelson et al. | | |
| 2007/0102314 A1 * | 5/2007 | Dedmon | ...... | 206/386 |
| 2009/0127261 A1 * | 5/2009 | Perucci et al. | ...... | 220/315 |

FOREIGN PATENT DOCUMENTS

GB 2037711 A * 7/1980
WO WO 9200901 A1 * 1/1992

* cited by examiner

*Primary Examiner* — Mickey Yu
*Assistant Examiner* — Robert J Hicks
(74) *Attorney, Agent, or Firm* — Hamre, Schumann, Mueller & Larson P.C.

(57) ABSTRACT

A collapsible and reusable drum having an outer sleeve, an injection molded bottom end cap, an injection molded top end cap, an input port positioned on the top end cap, and an output port positioned near the outer sleeve's lower portion. The drum may also include an inner sleeve positioned within the outer sleeve. The drum may also include at least one strap for securing the bottom and top end caps to the inner and outer sleeves. The at least one strap secures the end caps to the sleeves via strap retaining loops located on the top and bottom end caps and recessed channels traveling from one strap retaining loop located at one end of an end cap to another strap retaining loop located at the opposite end of the end cap. Moreover, the at least one strap is internalized between the inner sleeve and the outer sleeve.

22 Claims, 10 Drawing Sheets

COLLAPSIBLE AND REUSABLE DRUM

The present application claims the benefit of U.S. Provisional Patent Application Ser. No. 61/058,713, filed Jun. 4, 2008 and entitled "COLLAPSIBLE AND REUSABLE DRUM," and which is incorporated herewith by reference in its entirety.

BACKGROUND

This invention relates generally to methods and apparatus for shipping bulk liquids, near-liquids, or dry particulate materials and, more particularly, to methods and apparatus for shipping bulk liquids, near-liquids, or dry particulate materials in a liner that may be positioned within a container.

SUMMARY

A collapsible container is disclosed herein. The collapsible container includes an outer sleeve, and an inner sleeve positioned in the inner sleeve. The collapsible container also includes a top end cap and a bottom end cap. At lease one recessed channel is defined on an outer surface of at least one of the top and bottom end caps. A strap is placed along the recessed channel and adapted to secure the top and bottom end caps to the outer and inner sleeves.

In one embodiment, a collapsible container includes an outer sleeve that includes a first end, a second end opposed to the first end and a plurality of panels extending between the first and second ends. The panels are foldably connected to each other. The collapsible container also includes an inner sleeve positioned inside the outer sleeve. The inner sleeve includes a first end, a second end opposed to the first end and a plurality of panels extending between the first and second ends. The panels of the inner sleeve are foldably connected to each other. The collapsible container further includes a top end cap positioned adjacent the first ends of the outer and inner sleeves. The top end cap includes an inner surface facing the first ends of the outer and inner sleeves, an outer surface facing away from the first ends, a thickness defined by the inner and outer surfaces of the top end cap and at least two top strap retaining loops each extending through the thickness of the top end cap. The top end cap further includes an input port. The collapsible container further includes a bottom end cap positioned adjacent the second ends of the outer and inner sleeves. The bottom end cap includes an inner surface facing the second ends of the outer and inner sleeves, an outer surface facing away from the second ends, a thickness defined by the inner and outer surfaces of the bottom end cap and at least two bottom strap retaining loops each extending through the thickness of the bottom end cap. At least one recessed channel is defined in the outer surface of the top or bottom end cap and extends between the two strap retaining loops in the corresponding end cap. The collapsible container further includes at least one strap adapted to extend through the strap retaining loops and along the recessed channel to secure the top end cap to the first ends of the outer and inner sleeves and the bottom end cap to the second ends of the outer and inner sleeves.

In another embodiment, a method for making a collapsible container includes assembling an outer sleeve that includes a first end, a second end opposed to the first end, a plurality of panels extending between the first and second ends thereof and an outer output port. The panels of the outer sleeve are foldably connected to each other. The method also includes assembling an inner sleeve that includes a first end, a second end opposed to the first end and a plurality of panels extending between the first and second ends thereof an inner output port. The panels of the inner sleeve are foldably connected to each other. The method further includes placing the inner sleeve in an interior space of the outer sleeve such that the first and second ends of the inner sleeve are adjacent to the first and second ends of the outer sleeve, respectively, and the inner output port is aligned with the outer output port. The method further includes placing a top end cap adjacent the first ends of the outer and inner sleeves. The top end cap includes at least two top strap retaining loops extending through a thickness of the top end cap, at least one top recessed channel defined in an outer surface of the top end cap and extending between the two top strap retaining loops, and an input port. The method further includes placing a bottom end cap adjacent to the second ends of the outer and inner sleeves. The bottom end cap includes at least two bottom strap retaining loops extending through a thickness of the bottom end cap, at least one bottom recessed channel defined in an outer surface of the bottom end cap and extending between the two bottom strap retaining loops. The method further includes placing at least one strap through the strap retaining loops and along the recessed channels to secure the top and bottom end caps to the first and second ends of the outer and inner sleeves, respectively.

BRIEF DESCRIPTION OF THE DRAWINGS

The foregoing and other features and aspects of the invention will be best understood with reference to the following description of certain exemplary embodiments of the invention, when read in conjunction with the accompanying drawings, wherein.

DETAILED DESCRIPTION

Figure 1:
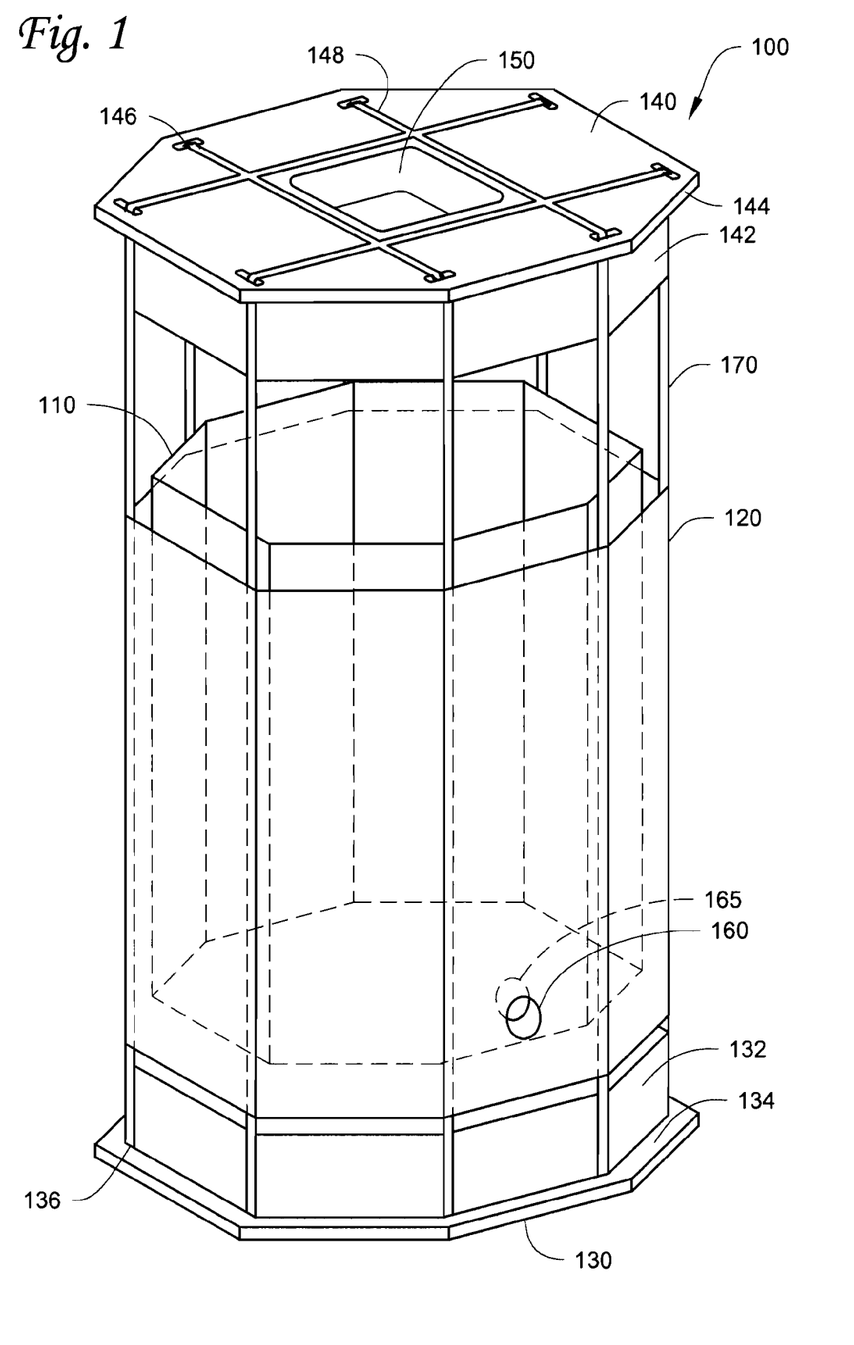
FIG. 1 illustrates an intermediate bulk container in accordance with an exemplary embodiment of the invention.

Referring now to FIG. 1, there is illustrated an intermediate bulk container in accordance with an exemplary embodiment of the invention. This intermediate bulk container 100, sometimes referred to as an IBC unit in the industry, is made to hold various volumes of materials, including, but not limited to, bulk liquids, near-liquids, or dry particulate materials. According to an exemplary embodiment, the IBC unit 100 has an outer sleeve 120, a bottom end cap 130, a top end cap 140, an input port 150 positioned on the top end cap 140, and an output port 160 positioned near the lower portion of the outer sleeve 120. Additionally, the IBC unit 100 may also include an inner sleeve 110 that is positioned within the interior side of the outer sleeve 120. Furthermore, the IBC unit 100 may also include at least one strap 170 for securing the bottom end cap 130 and the top end cap 140 to the inner sleeve 110 and the outer sleeve 120. The IBC unit 100 is a 55 gallon drum, or 210 liter drum, that is dimensioned such that four (4) IBC units 100 may fit on a standard size pallet. In a standard 20 feet ocean container, 20 standard size pallets may fit within it. Thus, in a standard 20 feet ocean container, about 80 IBC units may fit within it, in accordance with an exemplary embodiment.

In accordance with the present embodiment, the outer sleeve 120 is illustrated with eight sides, each side having alternating widths of about 20 inches and about 18 inches. The height of the outer sleeve 120 is about 40 inches. The outer sleeve 120 has at least one output port 160 located at the lower portion of the outer sleeve 120. The outer sleeve 120 is fabricated from a 6 mm fluted polypropylene sheet. Although this embodiment utilizes a height dimension of about 40 inches, a greater or lesser height dimension may be utilized without departing from the scope and spirit of the exemplary embodiment. Additionally, although this embodiment utilizes sides that have alternating widths of about 20 inches and about 18 inches, the width of each side may be wider or narrower without departing from the scope and spirit of the exemplary embodiment. Furthermore, although this embodiment utilizes an octagonal geometry, other geometric shapes may be utilized without departing from the scope and spirit of the exemplary embodiment. Moreover, other materials may be used for constructing the outer sleeve 120, including, but not limited to, polyvinyl chloride, polypropylene, polyethylene, Coroplast, thermoplastics, and any other polymer materials, without departing from the scope and spirit of the exemplary embodiment.

In accordance with the present embodiment, the inner sleeve 110 also is illustrated with eight sides, each side having alternating widths of about 20 inches and about 18 inches. The height of the inner sleeve 110 is also about 40 inches. The inner sleeve 110 also has at least one outlet port 165 located at the lower portion of the inner sleeve 110. The inner sleeve's 110 at least one outlet port 165 is aligned with the outer sleeve's 120 at least one output port 160 so that the materials placed within the IBC unit 100 may discharge or be pumped out when desired. The inner sleeve 110 also is fabricated from a 6 mm fluted polypropylene sheet. Although this embodiment utilizes a height dimension of about 40 inches, a greater or lesser height dimension may be utilized without departing from the scope and spirit of the exemplary embodiment. Additionally, although this embodiment utilizes sides that have alternating widths of about 20 inches and about 18 inches, the width of each side may be wider or narrower so long as the widths are the same as or slightly less than the widths of the outer sleeve 120, without departing from the scope and spirit of the exemplary embodiment. Furthermore, although this embodiment utilizes an octagonal geometry, other geometric shapes may be utilized without departing from the scope and spirit of the exemplary embodiment. Moreover, other materials may be used for constructing the inner sleeve 110, including, but not limited to, polyvinyl chloride, polypropylene, polyethylene, Coroplast, thermoplastics, and any other polymer materials, without departing from the scope and spirit of the exemplary embodiment.

The inner sleeve 110 and the outer sleeve 120 are designed to be collapsible to about a 4:1 ratio. The inner sleeve 110 may remain within the outer sleeve 120 and be collapsible. Alternatively, the inner sleeve 110 may be separated from the interior side of the outer sleeve 120 so that the inner sleeve 110 and the outer sleeve 120 may both be separately collapsible. This collapsible feature allows for lower cost when transporting empty IBC units.

The bottom end cap 130 is octagonally shaped and has a substantially planar surface, that includes an interior side which faces the sleeves 110, 120 and an exterior side which faces away from the sleeves 110, 120. The bottom end cap 130 also includes a side wall 132 that is substantially perpendicular to the substantially planar surface and extends a predetermined distance away from the interior side of the bottom end cap's 130 substantially planar surface. The side wall 132 is located a desired distance away from the outer edge of the bottom end cap 130, thereby forming a lip 134 around the edge of the bottom end cap 130. The side wall 132 is illustrated with eight sides, each side having alternating widths of about 20 inches and about 18 inches. Additionally, the lip 134 may include a plurality of strap retaining loops 136 that are positioned between the side wall 132 and the outer edge of the bottom end cap 130. According to one embodiment, the plurality of strap retaining loops 136 are positioned adjacent to the side wall 132. Also, the plurality of strap retaining loops 136 may be positioned such that there is a strap retaining loop 136 positioned at the corners of each of the 20" sides. Additionally, the exterior side of the bottom end cap's 130 substantially planar surface includes a recessed channel 138 extending from each of the plurality of strap retaining loops 136 to a corresponding strap retaining loop 136 located at the opposite end of the bottom end cap 130. The recessed channel 138 is approximately ¼" deep. The bottom end cap 130 is injection molded and may be made of any material capable of being injection molded, including, but not limited to, polyvinyl chloride, polypropylene, polyethylene, thermoplastics, and any other polymer materials.

Although the bottom end cap is shown to be octagonally shaped, the bottom end cap may form any other geometric shape that may be similar or different than the shape of the inner sleeve and the outer sleeve without departing from the scope and spirit of the exemplary embodiment. For example, the side wall may be octagonally shaped and shaped similarly to the inner and outer sleeves, but the outer edge of the bottom end cap may be circular in shape. Also, although this embodiment utilizes side walls that have alternating widths of about 20 inches and about 18 inches, the width of each side wall may be wider or narrower, so long as the width corresponds to about the width of the outer sleeve 120, without departing from the scope and spirit of the exemplary embodiment. Furthermore, although the plurality of strap retaining loops 136 are shown to be positioned such that there is a strap retaining loop positioned at the corners of each of the 20" sides, the strap retaining loops may be positioned at the corners of each of the 18" sides or a combination of the 20" and 18" sides without departing from the scope and spirit of the exemplary embodiment. Moreover, although the recessed channel is shown to be about ¼" deep, the depth may be greater or less without departing from the scope and spirit of the exemplary embodiment.

Figure 3:
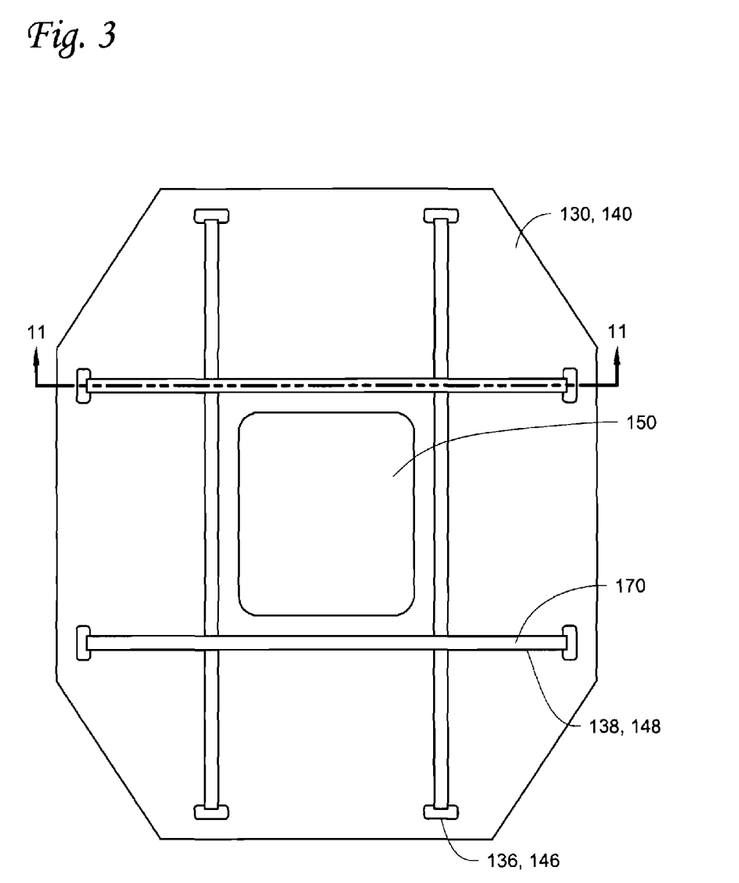
FIG. 3 shows a top end view of the IBC unit completely assembled in accordance with an exemplary embodiment.
Figure 3A:
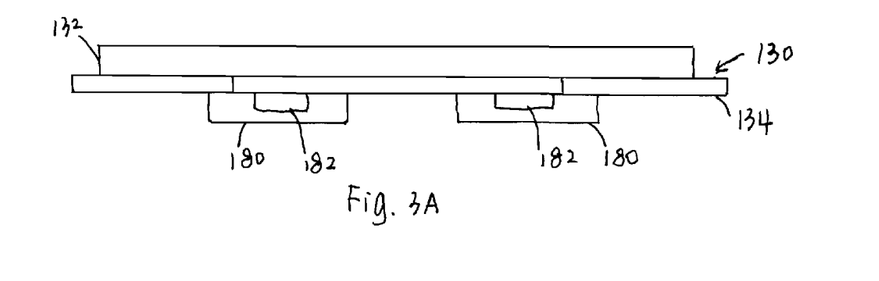
FIG. 3A shows a side view of a bottom end cap of the IBC unit completely assembled in accordance with an exemplary embodiment.

With reference to FIG. 3A, the bottom end cap 130 of the container 100 is also injection molded to provide a protrusion 180 at the bottom of the planar surface of the bottom end cap 130 whereby at least one slot 182 is defined in the protrusion 180 in order to allow at least one brace of a transporter to be inserted into the slot 182. The slot 182 is substantially deep but not necessary through the protrusion 180. Upon the brace of the transporter being inserted into the slot 182 at the bottom end cap 130, the user can lift the container 100 above the ground for transporting the container 100 to another location.

The top end cap 140 is octagonally shaped and has a substantially planar surface, that includes an interior side which faces the sleeves 110, 120 and an exterior side which faces away from the sleeves 110, 120. The top end cap 140 also includes a side wall 142 that is substantially perpendicular to the substantially planar surface and extends a predetermined distance away from the interior side of the top end cap's 140 substantially planar surface. The side wall 142 is located a desired distance away from the outer edge of the top end cap 140, thereby forming a lip 144 around the edge of the top end cap 140. The side wall 142 is illustrated with eight sides, each side having alternating widths of about 20 inches and about 18 inches. Additionally, the lip 144 includes a plurality of strap retaining loops 146 that are positioned between the side wall 142 and the outer edge of the top end cap 140. According to one embodiment, the plurality of strap retaining loops 146 are positioned adjacent to the side wall 142. Also, the plurality of strap retaining loops 146 may be positioned such that there is a strap retaining loop positioned at the corners of each of the 20" sides.

Although the top end cap is shown to be octagonally shaped, the top end cap may form any other geometric shape that may be similar or different than the shape of the inner sleeve and the outer sleeve without departing from the scope and spirit of the exemplary embodiment. For example, the side wall may be octagonally shaped and shaped similarly to the inner and outer sleeves, but the outer edge of the top end cap may be circular in shape. Also, although this embodiment utilizes side walls that have alternating widths of about 20 inches and about 18 inches, the width of each side wall may be wider or narrower, so long as the width corresponds to about the width of the outer sleeve 120, without departing from the scope and spirit of the exemplary embodiment. Furthermore, although the plurality of strap retaining loops 136 are shown to be positioned such that there is a strap retaining loop positioned at the corners of each of the 20" sides, the strap retaining loops may be positioned at the corners of each of the 18" sides or a combination of the 20" and 18" sides without departing from the scope and spirit of the exemplary embodiment.

The exterior side of the top end cap's 140 substantially planar surface may include a recessed channel 148 extending from each of the plurality of strap retaining loops 146 to a corresponding strap retaining loop 146 located at the opposite end of the top end cap 140. The recessed channel 148 is approximately ¼" deep. Moreover, although the recessed channel is shown to be about ¼" deep, the depth may be greater or less without departing from the scope and spirit of the exemplary embodiment.

Figure 2:
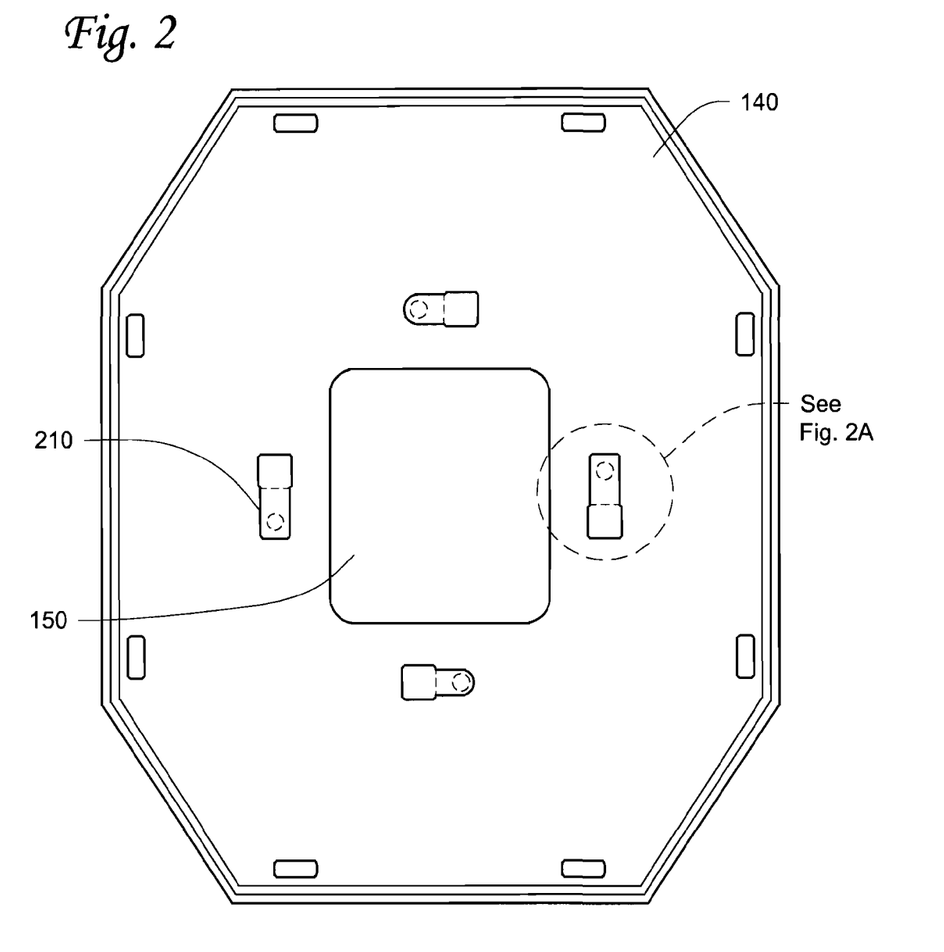
FIG. 2 illustrates the interior side of the top end cap in accordance with an exemplary embodiment.
Figure 2A:
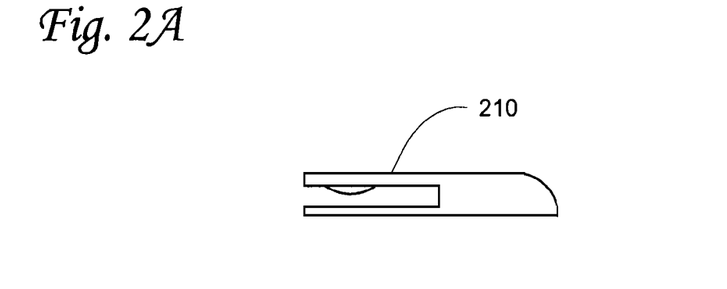
FIG. 2A is an enlarged view of a female twist-to-lock bag hanger in the circled area in FIG. 2.

FIG. 2 illustrates the interior side of the top end cap in accordance with an exemplary embodiment. Referring now to FIG. 1 and FIG. 2, the top end cap 140 may include the input port 150 which extends through the top end cap 140. The input port 150 is substantially centered with respect to the top end cap 140 and may have a rectangular or square shape. This input port 150 may be recessed into the top end cap 140 so that when a cap 920 (FIG. 9) is coupled to the input port 150, the top profile of the cap 920 (FIG. 9) is about the same or lower than the exterior surface of the top end cap 140. The top end cap 140 may also include a plurality of female twist-to-lock hangers 210 located on the interior side of the top end cap 140 and spaced apart around the input port 150. The top end cap 140 is injection molded and may be made of any material capable of being injection molded, including, but not limited to, polyvinyl chloride, polypropylene, polyethylene, thermoplastics, and any other polymer materials. Although the input port is shown to be substantially centered, the input port may be positioned off-center without departing from the scope and spirit of the exemplary embodiment. Additionally, although the input port is shown to be rectangular or square shaped, other geometric shapes may be utilized for the input port without departing from the scope and spirit of the exemplary embodiment. Additionally, although the female twist-to-lock hangers are shown to be on the interior side of the top end cap, the female twist-to-lock hangers may instead be located on the exterior side of the top end cap without departing from the scope and spirit of the exemplary embodiment. Furthermore, although the top end cap includes a plurality of female twist-to-lock hangers, the hangers may be male twist-to-lock hangers without departing from the scope and spirit of the exemplary embodiment. Moreover, although the top end cap utilizes a plurality of female twist-to-lock hangers for coupling an inner bladder through the input port, other known methods of coupling the inner bladder through the input port may be used without departing from the scope and spirit of the exemplary embodiment.

FIG. 3 illustrates the exterior side of the top end cap in accordance with an exemplary embodiment. FIG. 3 may also represent the bottom end cap in accordance with an exemplary embodiment, except that the input port 150 would not be shown. Now referring to FIG. 1 and FIG. 3, the at least one strap 170 for securing the bottom end cap 130 and the top end cap 140 to the inner sleeve 110 and the outer sleeve 120 is a 2,000 pound rated polypropylene strap. The at least one strap 170 is positioned within the channels 138, 148 of the bottom end cap 130 and the top end cap 140, respectively, passes between the inner sleeve 110 and the outer sleeve 120, and passes through the plurality of strap retaining loops 136, 146 of the bottom end cap 130 and the top end cap 140, respectively. Thus, the at least one strap 170 has been internalized between the inner sleeve 110 and the outer sleeve 120, which thereby protects the straps from damage during shipment. The channels 138, 148 serve to protect the at least one strap and maintain the alignment. According to an exemplary embodiment, one of the at least one strap may pass through two strap retaining loops 146 on the top end cap 140, wherein each strap retaining loop 146 is located at opposite ends of the top end cap 140, and two strap retaining loops 136 on the bottom end cap 130, wherein each strap retaining loop 136 is located at opposite ends of the bottom end cap 130. According to FIG. 1 and FIG. 3, there are four straps 170 used to secure the bottom end cap 130 and the top end cap 140 to the inner sleeve 110 and the outer sleeve 120. When viewing the top end cap 140 and the bottom end cap 130, two of the straps are parallel to each other, while the other two straps are substantially perpendicular to the first two parallel straps. According to this embodiment, the four straps 170 are rated at 2,000 pounds each and compress the top end cap 140 and the bottom end cap 130 together, thereby developing an IBC unit having a high structural strength.

Although the at least one strap is shown to be manufactured from 2,000 pound rated polypropylene, other strapping materials may be used without departing from the scope and spirit of the exemplary embodiment. Also, although four straps have been illustrated for securing the bottom end cap and the top end cap to the inner sleeve and the outer sleeve, greater or fewer straps may be used without departing from the scope and spirit of the exemplary embodiment.

Figure 4:
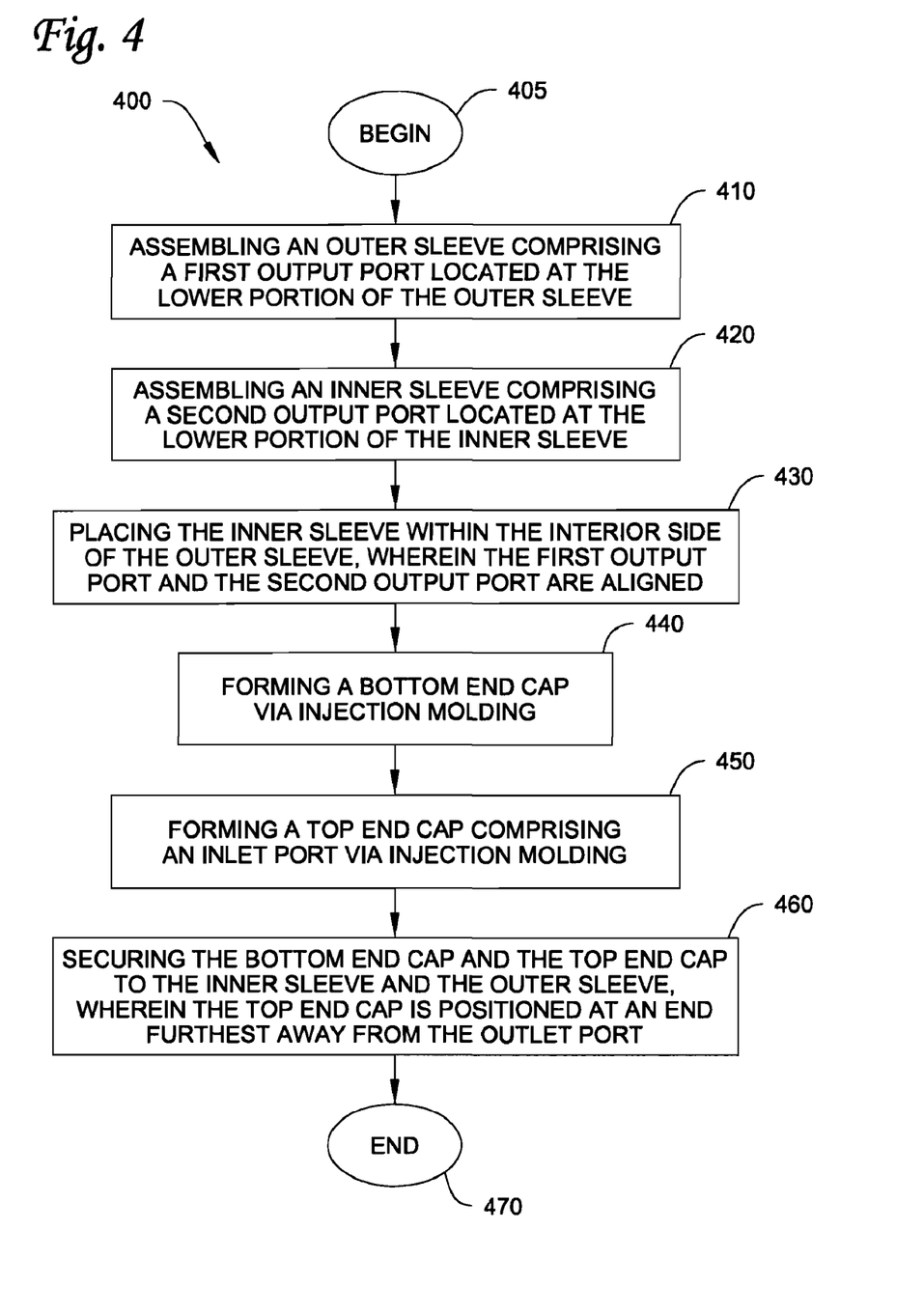
FIG. 4 illustrates a method for assembling the IBC unit in accordance with an exemplary embodiment.

FIG. 4 illustrates a method for assembling the IBC unit in accordance with an exemplary embodiment. Certain steps in the methods and processes described herein must naturally precede others for the present embodiment to function as described. However, the present invention is not limited to the order of the steps described if such order or sequence does not adversely alter the functionality of the present invention. That is, it is recognized that some steps may be performed before or after other steps or in parallel with other steps without departing from the scope and spirit of the present invention.

Figure 5A:
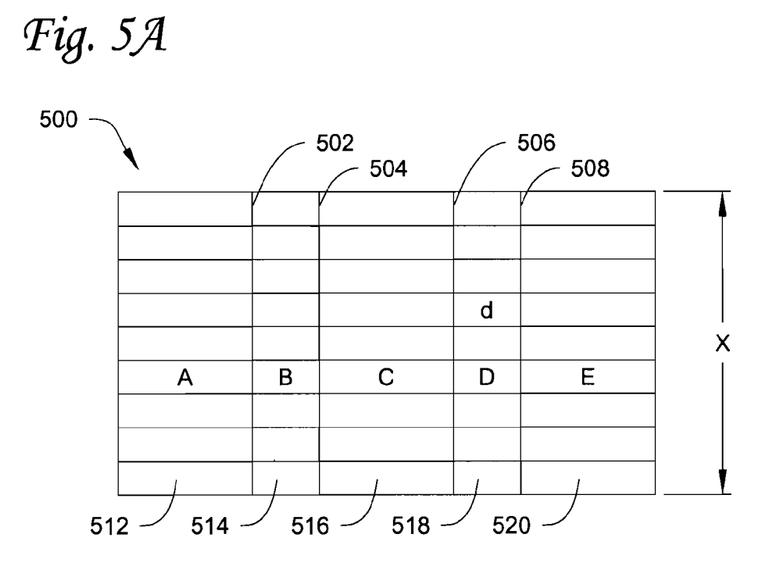
FIG. 5A illustrates a first sheet of material used for making a portion of the outer sleeve in accordance with an exemplary embodiment.
Figure 5B:
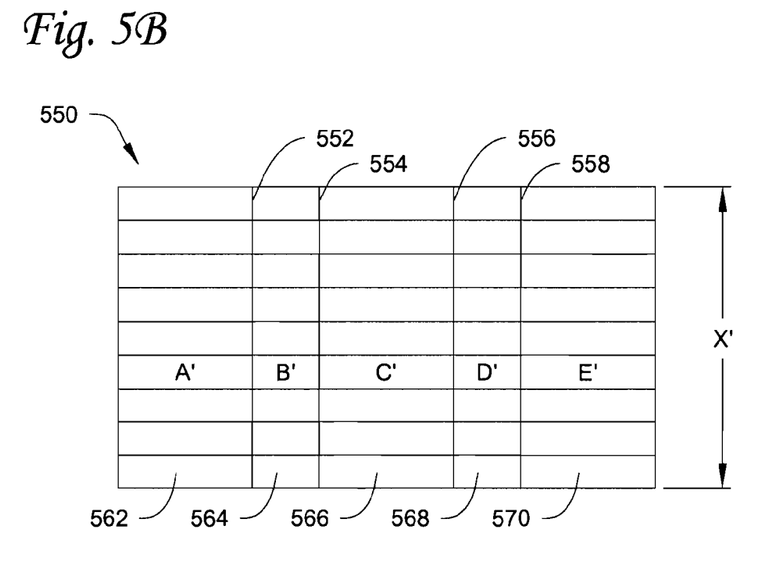
FIG. 5B illustrates a second sheet of material used for making a portion of the outer sleeve in accordance with an exemplary embodiment.

At step 405 the method for assembling the IBC unit 400 begins. At step 410, an outer sleeve comprising a first output port located at the lower portion of the outer sleeve is assembled. FIG. 5A illustrates a first sheet of material used for making a portion of the outer sleeve in accordance with an exemplary embodiment. FIG. 5B illustrates a second sheet of material used for making a portion of the outer sleeve in accordance with an exemplary embodiment.

Referring now to FIG. 5A and FIG. 5B, first sheet 500 has a height X and is scored along the lines 502, 504, 506 and 508, thereby resulting in the panels identified by the letters A 512, B 514, C 516, D 518 and E 520. According to this embodiment, the height dimension X is about 40 inches and the panels A 512, B 514, C 516, D 518 and E 520 are about 20 inches, about 18 inches, about 20 inches, about 18 inches, and about 20 inches, respectively. Although this embodiment utilizes a height dimension of about 40 inches, a greater or lesser height dimension may be utilized without departing from the scope and spirit of the exemplary embodiment. Additionally, although this embodiment utilizes five panels that are about 20 inches, about 18 inches, about 20 inches, about 18 inches, and about 20 inches, respectively, the length of each panel may be longer or shorter without departing from the scope and spirit of the exemplary embodiment. Furthermore, although this embodiment utilizes five panels, the number of panels may be greater or fewer without departing from the scope and spirit of the exemplary embodiment.

The first sheet 500 is made of about 6 mm fluted polypropylene. Although first sheet 500 is illustrated as being manufactured from 6 mm polypropylene, other materials capable of being re-shaped, e.g., Coroplast, PVC, polyethylene, thermoplastics, or other polymers, may be used without departing from the scope and spirit of the exemplary embodiment. Additionally, although this embodiment describes a thickness of about 6 mm, other thicknesses, greater or smaller, may be used without departing from the scope and spirit of the exemplary embodiment. Furthermore, although this embodiment describes a fluted material, materials having alternative shapes may be used without departing from the scope and spirit of the exemplary embodiment.

Similarly, the second sheet 550 has a height X' and is scored along the lines 552, 554, 556 and 558, thereby resulting in the panels identified by the letters A' 562, B' 564, C' 566, D' 568 and E' 570. All of the dimensions of the second sheet of material 550 correspond substantially identically to the first sheet of material 500 and the panels A' 562, B' 564, C' 566, D' 568 and E' 570 correspond substantially to the dimensions of the panels A 512, B 514, C 516, D 518 and E 520. The height, dimensions of the panels, number of panels and the material of construction for the second sheet 550 is similar to the description provided above with respect to the properties of the first sheet 500.

In order to fabricate the outer sleeve of the IBC unit, panel E 520 of the first sheet 500 is placed over the panel A' 562 of the second sheet 550 where the two panels are joined together. Similarly, panel A 512 of the first sheet 500 is placed over the panel E' 570 of the second sheet 550 where the two panels are again joined together to complete the octagonal shape of the outer sleeve. According to one embodiment, the panels are joined together by heat welding them together. Although not illustrated in FIG. 5A or FIG. 5B, the output port 160 may be formed in any of the panels. Although this embodiment shows that panel E is placed over panel A', panel A' may be placed over panel E without departing from the scope and spirit of the exemplary embodiment. Similarly, although this embodiment shows that panel A is placed over panel E', panel E' may be placed over panel A without departing from the scope and spirit of the exemplary embodiment.

It should be appreciated that the outer sleeve has two sections which are double wall thickness, viz, E and A' being one such double wall thickness and A and E' being a second double wall thickness, and being 180° apart.

Referring to FIG. 4, FIG. 5A, and FIG. 5B, at step 420, an inner sleeve comprising a second output port located at the lower portion of the inner sleeve is assembled. In the same manner as described above for the fabrication of the outer sleeve, the inner sleeve 110 is fabricated from a second pair of sheets, a third sheet and a fourth sheet (not illustrated). This third sheet and fourth sheet are made similar to the first sheet 500 and the second sheet 550. These third and fourth sheets are fabricated corresponding to the first sheet 500 and the second sheet 550 and are heat welded in a similar manner to form the inner sleeve 110. If desired, the third and fourth sheets which form the inner sleeve 110 can use panels which may be only slightly smaller than the panels illustrated for first sheet 500 and second sheet 550; but, this is not necessary because of the materials' tendency to have some flexibility.

It should be appreciated that the inner sleeve, similar to the outer sleeve, also has two sections which are double wall thickness, each being 180° apart.

Figures 6, 6A:
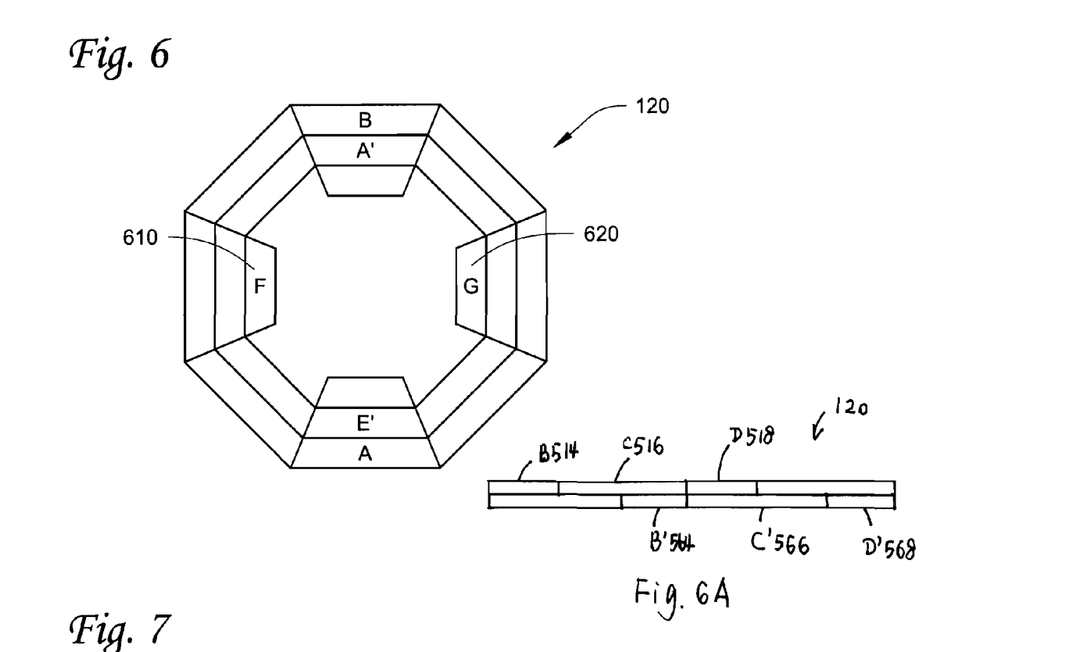
FIG. 6 shows the sidewalls of the IBC unit once the inner sleeve has been positioned within the outer sleeve in accordance with an exemplary embodiment.
FIG. 6A shows an outer sleeve in a folded configuration.

At step 430, the inner sleeve is placed within the interior side of the outer sleeve, wherein the first output port and the second output port are aligned. FIG. 6 shows the sidewalls of the IBC unit once the inner sleeve has been positioned within the outer sleeve in accordance with an exemplary embodiment. As previously stated, it should be appreciated that before the inner sleeve 110 is inserted within the outer sleeve 120, that the outer sleeve 120 has two sections which are double wall thickness, E 220 and A' 312 being one such double wall thickness and A 212 and E' 320 being a second double wall thickness, and being 180° apart. It should also be appreciated that the inner sleeve 110 also has two sections which are double wall thickness, and being 180° apart.

Therefore, when the inner sleeve 110 is inserted within the outer sleeve 120, the inner sleeve 110 may be rotated to be within the interior of the outer sleeve 120 such that the inner sleeve's double wall thickness portions, F 610 and G 620, which are 180° apart, are 90° apart from either of the double wall sections of the outer sleeve 120. This configuration is illustrated in FIG. 6. As an end result, there may be four triple wall sections, rotated 90° each around the periphery of the octagonal shape, thereby resulting in an octagonal shaped container having a totally unexpectedly strong mechanical configuration. Also as illustrated in FIG. 6, because of the way the inner sleeve 110 is rotated with respect to the outer sleeve 120, alternating between each pair of the triple wall sections is a double wall configuration. Although this embodiment is shown having four tripled wall portions, wherein each tripled wall portion is separated by a double wall portion, other configurations may exist without departing from the scope and spirit of the present embodiment. According to one embodiment, the first output port and the second output port are both aligned. In an alternative embodiment, the first output port may not be aligned with the second output port, however the first output port and the second output port are fluidly coupled to one another.

According to one embodiment, the inner sleeve 110 may be inserted into the outer sleeve 120 by first folding the inner sleeve 110 into a z-shape and then inserting the inner sleeve 110 completely within the interior side of the outer sleeve 120. Once properly positioned, the inner sleeve 110 may be snapped into place so that the top most edge of the inner sleeve 110 is aligned with the top most edge of the outer sleeve 120.

At step 440, the bottom end cap is fabricated via injection molding. The bottom end cap is formed, as previously described, with a lip including a plurality of strap retaining loops that are positioned between the side wall and the outer edge of the bottom end cap. Additionally, the bottom end cap is formed with one or more recessed channels, also as previously described. The bottom end cap may be made of any material capable of being injection molded, including, but not limited to, polyvinyl chloride, polypropylene, polyethylene, thermoplastics, and any other polymer materials.

At step 450, the top end cap comprising an inlet port is fabricated via injection molding. The top end cap is formed, as previously described, with a lip including a plurality of strap retaining loops that are positioned between the side wall and the outer edge of the bottom end cap. Additionally, the top end cap is formed with one or more recessed channels, also as previously described. The top end cap may be made of any material capable of being injection molded, including, but not limited to, polyvinyl chloride, polypropylene, polyethylene, thermoplastics, and any other polymer materials. Additionally, female twist-to-lock hangers may be integrally formed to the interior side of the top end cap. Alternatively, these female twist-to-lock hangers may be formed separately from the top end cap and later fastened to the top end cap. Although one embodiment shows the female twist-to-lock hangers to be positioned on the interior side of the top end cap, the female twist-to-lock hangers may be positioned on the exterior side of the top end cap. Furthermore, the top end cap is formed with an inlet port, details of which have been previously described.

At step 460, the bottom end cap and the top end cap are secured to the inner sleeve and the outer sleeve, wherein the top end cap is positioned at an end furthest away from the outlet port. The bottom end cap's side wall 132 is positioned on the interior side of the inner sleeve 110. The bottom end cap's lip 134 extends from the side wall 132 and terminates at the outer periphery of the outer sleeve 120 or slightly beyond the outer periphery of the outer sleeve 120. The bottom end cap's strap retaining loops 136 are positioned such that the straps 170 travel between the outer wall of the inner sleeve 110 and the inner wall of the outer sleeve 120.

Similarly, the top end cap's side wall 142 is also positioned on the interior side of the inner sleeve 110. The top end cap's lip 144 extends from the side wall 142 and terminates at the outer periphery of the outer sleeve 120 or slightly beyond the outer periphery of the outer sleeve 120. The top end cap's strap retaining loops 146 are positioned such that the straps 170 travel between the outer wall of the inner sleeve 110 and the inner wall of the outer sleeve 120.

The plurality of straps 170 may be coupled to the IBC unit 100 by inserting one end of the strap 170 through one of the bottom end cap's retaining loops 136. That one end of the strap 170 may then be inserted through a passageway formed between the outer wall of the inner sleeve 110 and the inner wall of the outer sleeve 120. That one end of the strap 170 is then inserted through one of the top end cap's retaining loop 146, which is located directly in line with the bottom end cap's retaining loop 136. Subsequently, that one end of the strap 170 is then inserted through another top end cap's retaining loop 146, which is located at the opposing end of the top end cap 140. This portion of the strap 170 may be positioned within the recessed channel 148 traveling from one retaining loop 146 to the other retaining loop 146. That one end of the strap is then inserted through a passageway formed between the outer wall of the inner sleeve 110 and the inner wall of the outer sleeve 120. That one end of the strap 170 is then inserted through one of the bottom end cap's retaining loop 136, which is located directly in line with the another top end cap's retaining loop 146. That one end of the strap 170 is then coupled to the same continuous strap 170, which is located at one of the bottom end cap's retaining loop 136. This portion of the strap 170 may be positioned within the recessed channel 138 traveling from one retaining loop 136 to the other retaining loop 136. The strap 170 may then be cut and the two ends may be tightened and heat sealed together, or fastened to one another by any other known means.

Although this embodiment has one end of the strap starting at one of the bottom end cap's retaining loops 136, the strap may start at any position and travel in a different direction, top to bottom instead of bottom to top, without departing from the scope and spirit of the exemplary embodiment. Additionally, it should be appreciated that the strap may be coupled to the IBC unit and through the two end caps while both end caps are not coupled to the inner sleeve and the outer sleeve without departing from the scope and spirit of the exemplary embodiment. Furthermore, the straps may be coupled when either one or both end caps are already coupled to the inner sleeve and the outer sleeve without departing from the scope and spirit of the exemplary embodiment. More over, the straps may be tightened either before the material is filled into the IBC unit or after the material fills the IBC unit.

With reference to FIG. 6A, the inner sleeve 110 and outer sleeve 120 are shaped to preferably an octagon shape when it is assembled. However, when transportation of the container 100 is needed without the load inside the container 100, there is a methodology which ensures that the storage of the inner sleeve 110 and outer sleeve 120 of the container 100 are done in a smallest possible space. When transportation of the container 100 is needed without the loads inside the container 100, the top end cap 140 and bottom end cap 130 can be removed from the container 100 by means of cutting the straps 170 binding the top end cap 140 and bottom end cap 130. After the top end cap 140 and bottom end cap 130 are removed, the inner sleeve 110 and outer sleeve 120 can be removed from the inner and outer sleeves 110, 120. In one embodiment, the inner and outer sleeves 110, 120 each includes eight panels. The panels can be folded and collapsed in order to form a substantially flat shape. Furtherance to this, multiple sleeves can be stacked on each other in order to space saving storage or transportation.

Figure 7:
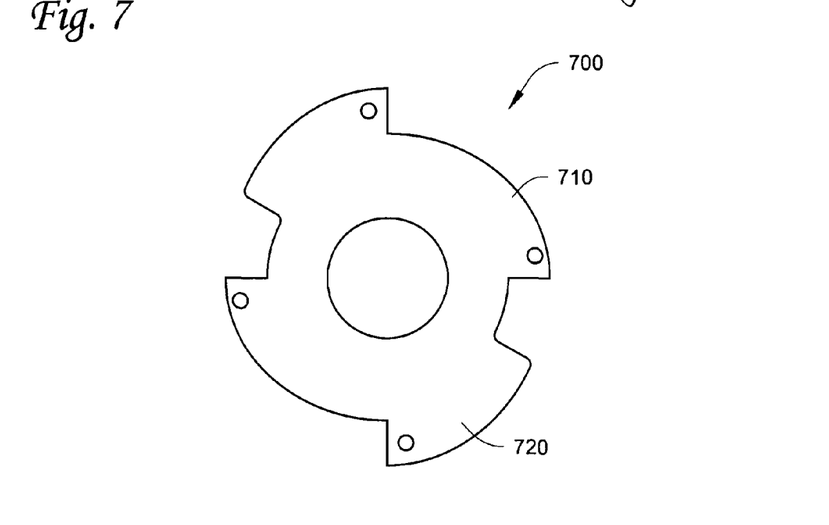
FIG. 7 shows a male twist-to-lock bag hanger in accordance with an exemplary embodiment.

FIG. 7 shows a male twist-to-lock bag hanger in accordance with an exemplary embodiment. The male twist-to-lock bag hanger 700 comprises a substantially circular disk 710 with a hole formed therewithin and four protrusions 720 extending from the substantially circular disk 710. Each of the four protrusions 720 have a hole defined therewithin such that the female twist-to-lock bag hanger 210 may be coupled to the male twist-to-lock bag hanger 700.

Figure 8:
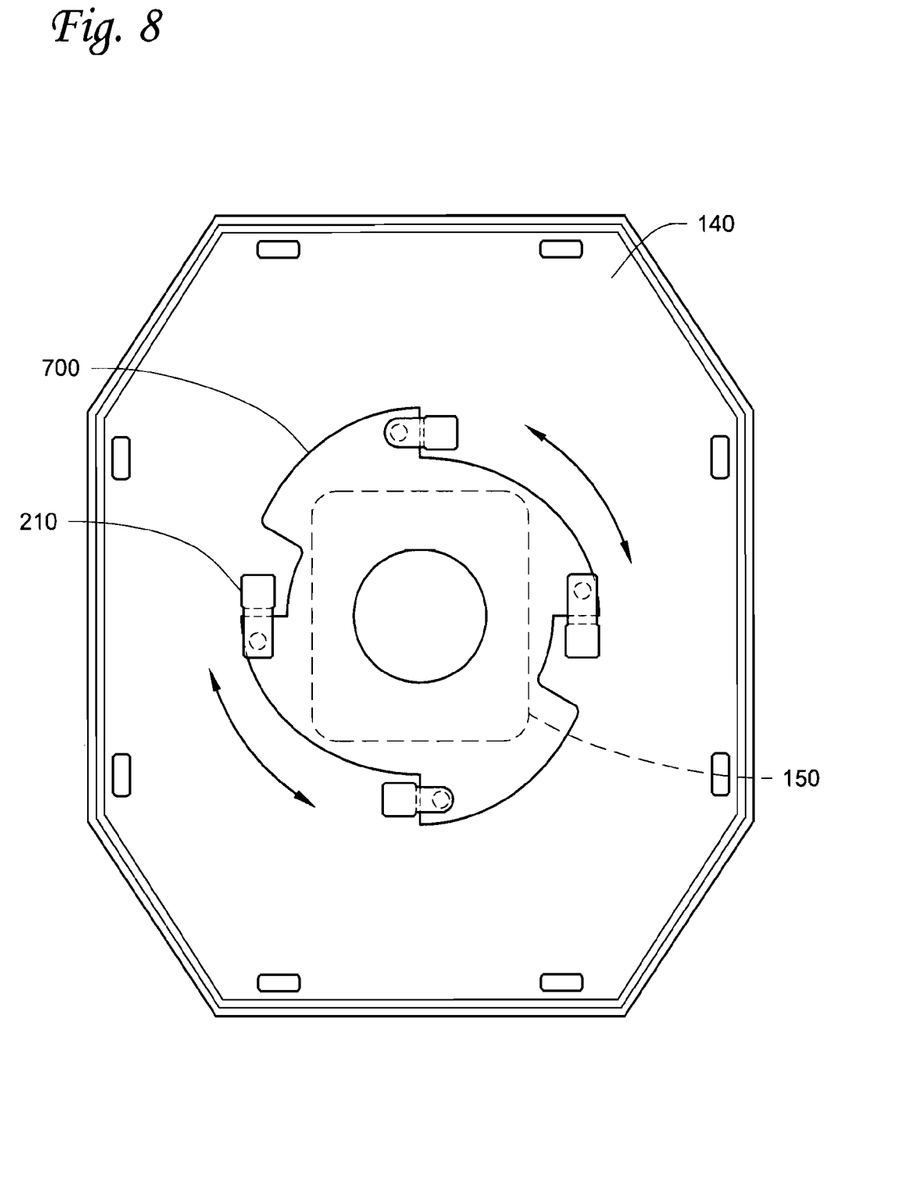
FIG. 8 shows the male twist-to-lock bag hanger being coupled to the female twist-to-lock bag hanger in accordance with an exemplary embodiment.

FIG. 8 shows the male twist-to-lock bag hanger being coupled to the female twist-to-lock bag hanger in accordance with an exemplary embodiment. According to this embodiment, the female twist-to-lock bag hangers 210 are located at the interior side of the top end cap 140. The male twist-to-lock bag hanger 700 is positioned angularly so that it may pass through the input port 150 and into the interior of the IBC unit 100. Once the male twist-to-lock bag hanger 710 is positioned within the IBC unit 100, the male twist-to-lock bag hanger 700 is positioned flush against the interior side of the top end cap 140 and then rotated to couple and lock with the female twist-to-lock bag hanger 210. According to this embodiment and the view provided in FIG. 8, the male twist-to-lock bag hanger 700 rotates in a clockwise manner to lock the male twist-to-lock bag hanger 700 to the female twist-to-lock bag hanger 210. However, in alternative embodiments, the manner of rotation may be reversed based on the positioning of the female twist-to-lock bag hangers without departing from the scope and spirit of the exemplary embodiment. Additionally, the male twist-to-lock bag hanger 700 and the female twist-to-lock bag hanger 210 may be positioned on the exterior side of the top end cap 140 without departing from the scope and spirit of the exemplary embodiment.

Figure 9:
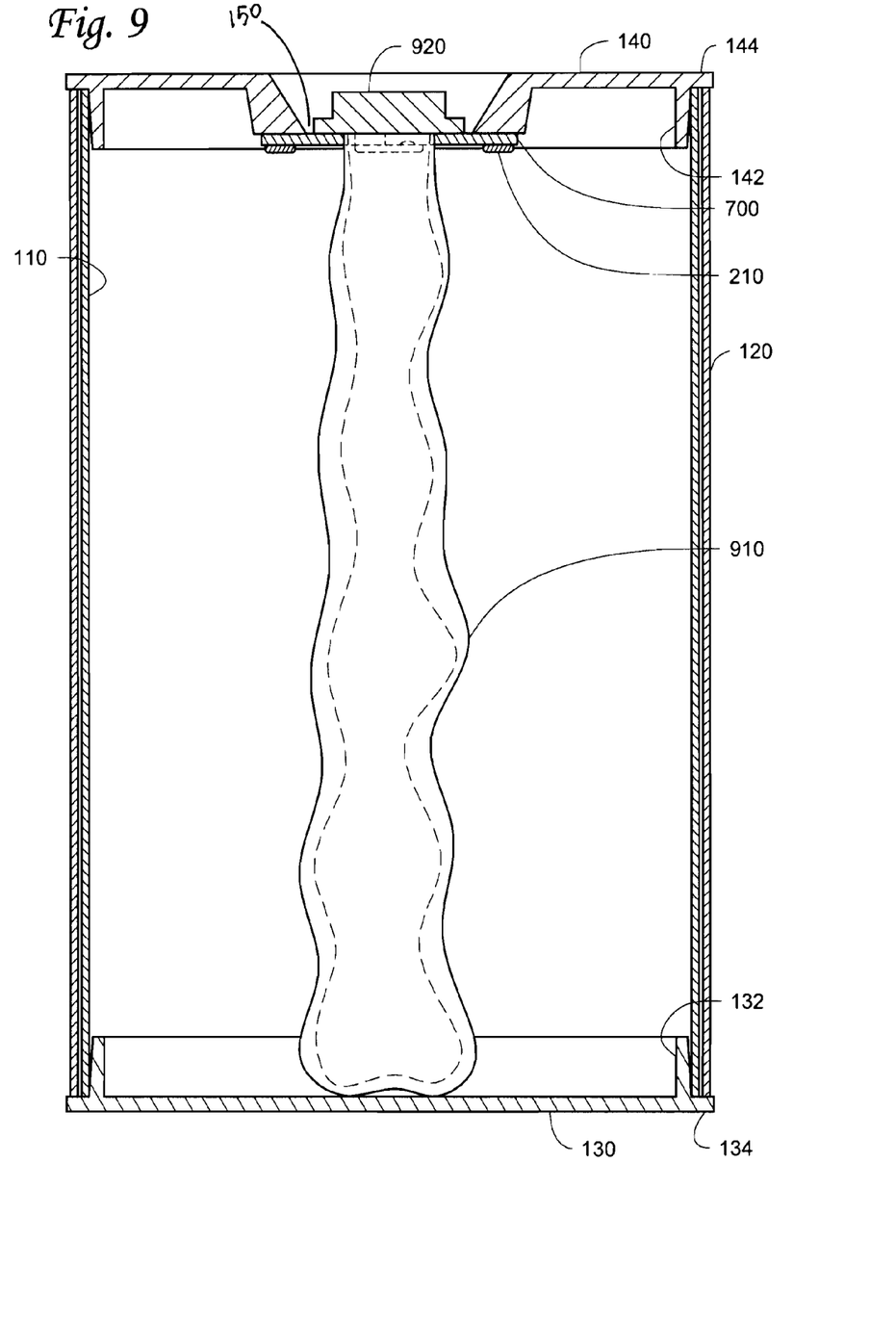
FIG. 9 shows a cross section view of the IBC unit completely assembled in accordance with the exemplary embodiment of FIG. 3.

FIG. 9 shows a cross section of the IBC unit completely assembled in accordance with an exemplary embodiment. As shown here, an inner bladder 910 having a fill port and a discharge port is coupled to the male twist-to-lock hanger 700 via the inner bladder's 910 fill port. A cap 920 is coupled to the male twist-to-lock bag hanger 700 and the inner bladder 910 such that the top profile of the cap 920 is about the same or lower than the exterior surface of the top end cap 140. Additionally, the sidewalls 132, 142 of the bottom end cap 130 and the top end cap 140 are positioned on the interior side of the inner sleeve 110. Furthermore, the edges of the bottom end cap's and the top end cap's lip 134, 144 extend to at least the exterior side of the outer sleeve 120. Additionally, the inner bladder's 910 discharge port is coupled to the output port 165 of the inner sleeve 110. Thus, materials may fill the IBC unit 100 through the input port 150 and the materials may be discharged from the IBC unit 100 through the output ports 160, 165. This inner bladder 910 may be disposable such that a new inner bladder 910 is used for each reuse. This inner bladder 910 is a low cost polyethylene liner. Although one embodiment shows that the inner bladder may be manufactured from polyethylene, other materials including, but not limited to, polyvinyl chloride, polypropylene, thermoplastics, and any other polymer materials may be utilized without departing from the scope and spirit of the exemplary embodiment.

The inner bladder 910 is sized so that it is able to pass through the input port 150. When there is a need for storage of loads in the container 100, the inner bladder 910 is inserted to the interior space of the inner sleeve 110 through the input port 150 and secured to an inner surface of the top end cap 140 by fastening mechanisms, e.g., a twist-to-lock connection. By doing so, there is no need for the top end cap 140 to be removed from the container 100. After the loads are being transferred out from the inner bladder 910, the inner bladder 910 can be removed from the interior space of the inner sleeve 110 by passing through the same input port 150 without the need to remove the top end cap 140 of the container 100. This is advantageous because the inner bladder 910 can be inserted and removed from the interior space of the inner sleeve 110 without the need to remove the top end cap 140, which is difficult and time consuming because of the need to cut the straps 170 binding the top end cap 140 and bottom end cap 130 and re-binding the straps 170 again when the inner bladder 910 is inserted into the interior space of the inner sleeves 110.

Figure 10:
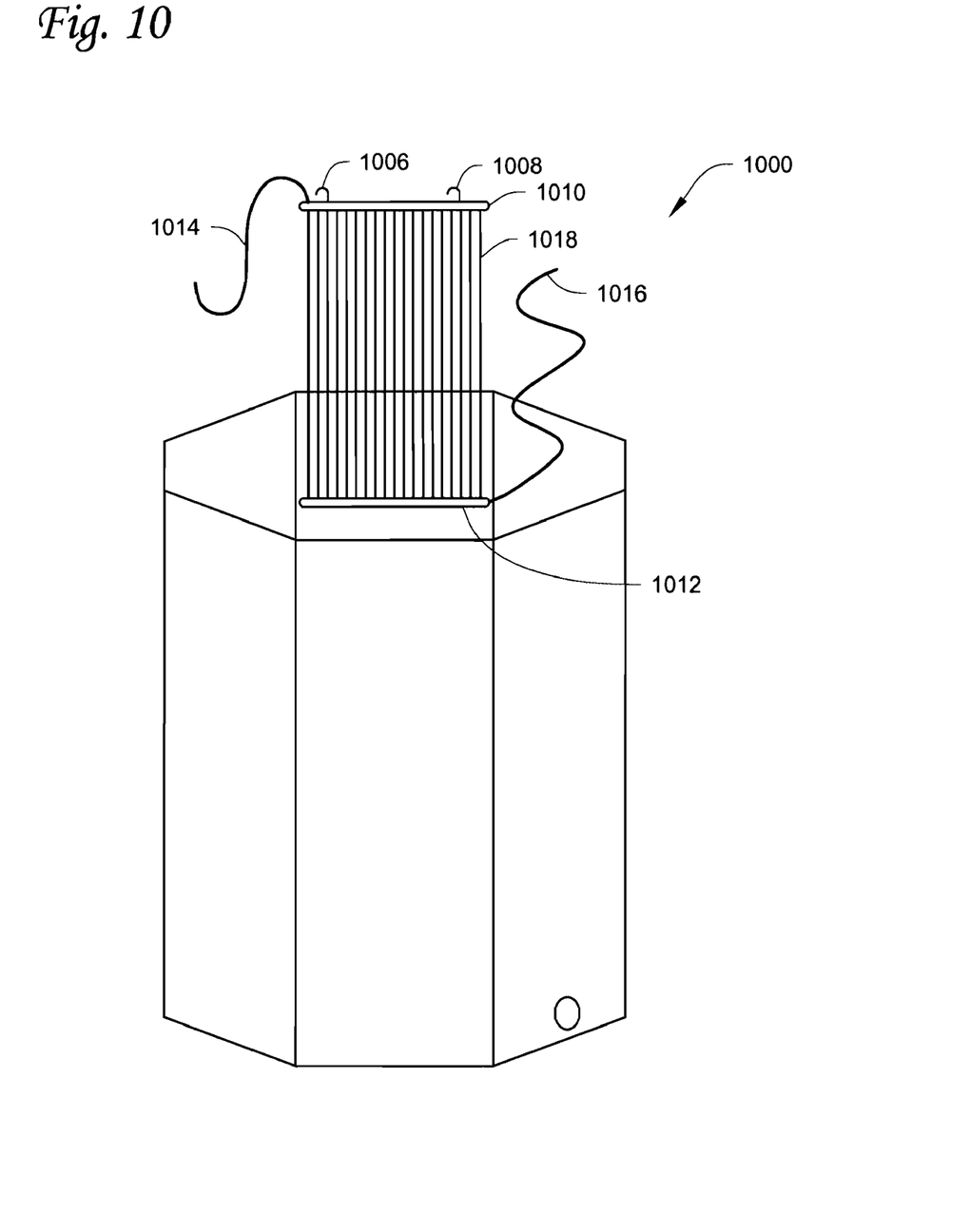
FIG. 10 illustrates a heat exchanger pad designed to be inserted between the inner sleeve and the inner bladder located within the inner sleeve in accordance with an exemplary embodiment.
Figure 11:
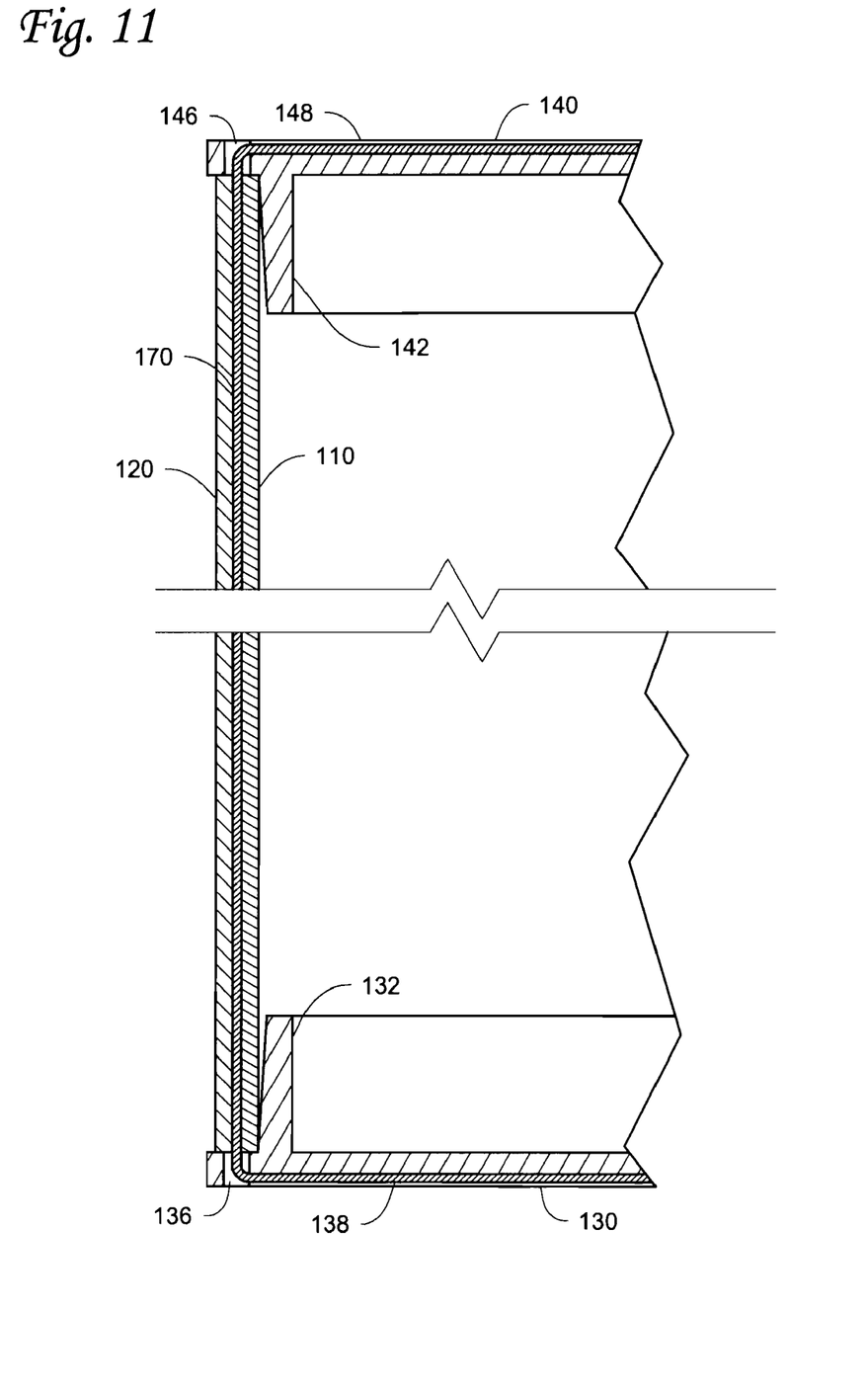
FIG. 11 is a cross section view of the IBC unit completely assembled in accordance with the exemplary embodiment in FIG. 3 along line 11-11.

Referring now to FIG. 10, there is illustrated a heat exchanger pad 1000 designed to be inserted between the inner sleeve 110 and the inner bladder 910 located within the inner sleeve 110 in accordance with an exemplary embodiment. A set of hangers 1006 and 1008 at the top end of the pad 1000 allow the pad 1000 to be hung off the top edge of the inner sleeve 110. An upper manifold 1010 and a lower manifold 1012 are connected, respectively, to an input hose 1014 and an output hose 1016. A plurality of conduits 1018 (hoses, pipes, etc.) are connected between the manifolds 1010 and 1012. It should be appreciated that one or more of such heat exchanger pads may be used within a given IBC unit.

In the operation of the pad 1000, if hot water or steam is all that is required, the hot water or steam is coupled into the input hose 1014 and circulated to the output hose 1016, via the lower manifold 1012, the conduits 1018, the upper manifold 1010, and the output hose 1016.

In some applications, for example, if chocolate is being shipped in the inner bladder 910 and is pumped into the inner bladder 910 while still hot, it will normally continue to "cook" after being pumped into the inner bladder 910, a sometimes undesirable scenario. However, by pumping cold water into the input hose 1014, the cooking can be slowed down or stopped, with no damage to the chocolate. Once the shipped product reaches its destination, hot water or steam can be run through the pad 1000, and the chocolate easily pumped out of the inner bladder 910.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims. It is therefore, contemplated that the claims will cover any such modifications or embodiments that fall within the scope of the invention.

What is claimed is:

1. A collapsible container comprising:
   an outer sleeve including a first end, a second end opposed to the first end and a plurality of panels extending between the first and second ends, the panels being foldably connected to each other;
   an inner sleeve positioned inside the outer sleeve, the inner sleeve including a first end, a second end opposed to the first end and a plurality of panels extending between the first and second ends, the panels being foldably connected to each other;
   a top end cap positioned adjacent the first ends of the outer and inner sleeves, the top end cap including an inner surface facing the first ends of the outer and inner sleeves, an outer surface facing away from the first ends, a thickness defined by the inner and outer surfaces of the top end cap and at least two top strap retaining loops each extending through the thickness of the top end cap, the top end cap further including an input port;

a bottom end cap positioned adjacent the second ends of the outer and inner sleeves, the bottom end cap including an inner surface facing the second ends of the outer and inner sleeves, an outer surface facing away from the second ends, a thickness defined by the inner and outer surfaces of the bottom end cap and at least two bottom strap retaining loops each extending through the thickness of the bottom end cap;

at least one recessed channel defined in the outer surface of the top or bottom end cap and extending between the two strap retaining loops in the corresponding end cap; and at least one strap adapted to extend through the strap retaining loops and along the recessed channel to secure the top end cap to the first ends of the outer and inner sleeves and the bottom end cap to the second ends of the outer and inner sleeves.

2. The collapsible container of claim 1, further comprising an outer output port defined in a lower portion of the outer sleeve, and an inner output port defined in a lower portion of the inner sleeve, the inner and outer output ports being aligned with each other.

3. The collapsible container of claim 1, wherein the outer and inner sleeves are each designed to be collapsible to a 4:1 ratio.

4. The collapsible container of claim 1, further comprising at least a recessed channel defined in the outer surface of the other end cap and extending between the two strap retaining loops in the corresponding end cap for receiving the strap.

5. The collapsible container of claim 1, wherein each end cap further includes an outer edge and a side wall positioned away from the outer edge, the side wall being substantially perpendicular to and extending a predetermined distance away from the inner surface of the each end cap, the inner surface of the each end cap being substantially planar.

6. The collapsible container of claim 5, wherein each end cap further includes a lip formed on a periphery of the each end cap outside the corresponding side wall.

7. The collapsible container of claim 6, wherein an outer surface of each side wall engages an inner surface of the inner sleeve adjacent the corresponding end of the inner sleeve, the strap retaining loops being formed in the lip of the corresponding end cap adjacent the each side wall.

8. The collapsible container of claim 4, wherein a plurality of recessed channels for receiving a plurality of straps are defined in the outer surface of each end cap, the plurality of recessed channels each extending from a strap retaining loop to a corresponding strap retaining loop positioned at an opposite end of the corresponding end cap.

9. The collapsible container of claim 1, wherein the strap is extended through a space between the outer and inner sleeves.

10. The collapsible container of claim 1, wherein the outer surface of the bottom end cap includes at least one built-in dolly slot for a dolly to be inserted to the slot for transportation of the container.

11. The collapsible container of claim 1, wherein the recessed channel has a depth of ¼ inch.

12. The collapsible container of claim 1, further including an inner bladder for containing materials to be shipped.

13. The collapsible container of claim 12, wherein the inner bladder is attached to the top end cap by a twist-to-lock connection between first and second twist-to-lock connection members.

14. The collapsible container of claim 13, wherein the top end cap includes the first twist-to-lock connection member and the inner bladder includes the second twist-to-lock connection member, wherein the first twist-to-lock connection member is a female twist-to-lock bag hanger and the second twist-to-lock connection member is a male twist-to-lock bag hanger.

15. The collapsible container of claim 12, wherein the inner bladder is sized to pass through the input port into an interior space of the inner sleeve such that the inner bladder is put in and taken out of the container without removing the top end cap from the container.

16. The collapsible container of claim 12, wherein the inner bladder includes a fill port having a cap, the input port of the top end cap being recessed into the outer surface of the top end cap such that a top surface of the cap of the fill port is leveled with or positioned lower than the outer surface of the top end cap.

17. The collapsible container of claim 12, further comprising at least a heat exchanger pad positioned inside the inner sleeve between the inner sleeve and the inner bladder.

18. The collapsible container of claim 1, wherein each of the outer and inner sleeves is foldable after the strap is cut and the top and bottom end caps are removed from the first ends and second ends of the outer and inner sleeves, respectively.

19. A method for making a collapsible container, comprising:

assembling an outer sleeve that includes a first end, a second end opposed to the first end, a plurality of panels extending between the first and second ends thereof and an outer output port, the panels of the outer sleeve being foldably connected to each other;

assembling an inner sleeve that includes a first end, a second end opposed to the first end and a plurality of panels extending between the first and second ends thereof an inner output port, the panels of the inner sleeve being foldably connected to each other;

placing the inner sleeve in an interior space of the outer sleeve such that the first and second ends of the inner sleeve are adjacent to the first and second ends of the outer sleeve, respectively, and the inner output port is aligned with the outer output port;

placing a top end cap adjacent the first ends of the outer and inner sleeves, the top end cap including at least two top strap retaining loops extending through a thickness of the top end cap, at least one top recessed channel defined in an outer surface of the top end cap and extending between the two top strap retaining loops, and an input port;

placing a bottom end cap adjacent to the second ends of the outer and inner sleeves, the bottom end cap including at least two bottom strap retaining loops extending through a thickness of the bottom end cap, at least one bottom recessed channel defined in an outer surface of the bottom end cap and extending between the two bottom strap retaining loops; and placing at least one strap through the strap retaining loops and along the recessed channels to secure the top and bottom end caps to the first and second ends of the outer and inner sleeves, respectively.

20. The method for making a collapsible container of claim 19, wherein assembling an outer sleeve and assembling an inner sleeve each comprising:

providing a first sheet having a first end panel, a second end panel and at least one middle panel;

providing a second sheet having a first end panel, a second end panel and at least one middle panel;

placing and heat welding the first end panel of the first sheet and the second end panel of the second sheet together, placing and heat welding the second end panel of the first sheet and the first end panel of the second sheet together, and obtaining the respective sleeve including panels extending between the first and second ends of the respective sleeve, wherein two of the panels of the respective sleeve each has double wall thickness.

21. The method for making a collapsible container of claim 20, wherein placing the inner sleeve in an interior space of the outer sleeve is performed in such a way that the two panels that have double wall thickness of the inner sleeve are each 90° apart from each of the two panels that have double wall thickness of the outer sleeve.

22. The method for making a collapsible container of claim 19, further comprising extending an inner bladder through the input port of the top end cap into an interior space of the inner sleeve and securing the inner bladder to an inner surface of the top end cap by a twist-to-lock connection.

* * * * *

UNITED STATES PATENT AND TRADEMARK OFFICE
CERTIFICATE OF CORRECTION

PATENT NO. : 8,167,159 B2
APPLICATION NO. : 12/478574
DATED : May 1, 2012
INVENTOR(S) : Nelson Page 1 of 1

It is certified that error appears in the above-identified patent and that said Letters Patent is hereby corrected as shown below:

On the Title page, Item [75]: "Charles M Nelson, Pening (MY)" should read
--Charles M Nelson, Penang (MY)--.

Signed and Sealed this
Sixth Day of August, 2013

Teresa Stanek Rea
*Acting Director of the United States Patent and Trademark Office*